UNITED STATES PATENT OFFICE

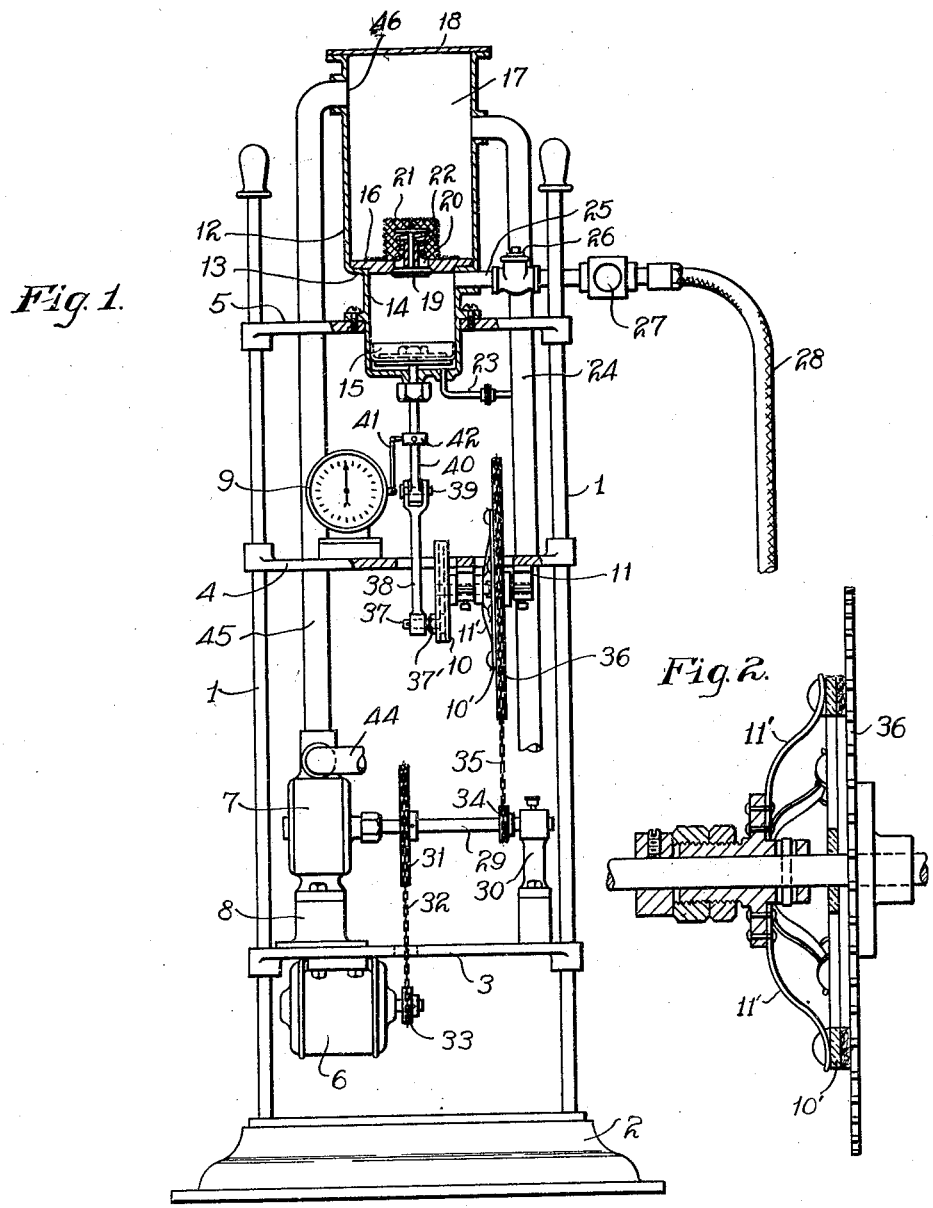

JOHN R. FOSTER, OF ROCHESTER, PENNSYLVANIA, ASSIGNOR TO THE CORRECT MEASURE COMPANY, OF ROCHESTER, PENNSYLVANIA, A CORPORATION OF PENNSYLVANIA

DISPENSING DEVICE

Application filed October 21, 1929. Serial No. 401,098.

This invention relates to liquid dispensing devices or pumps, more particularly to the type employed in dispensing gasoline.

It is among the objects of this invention to provide a gasoline dispensing pump which shall be adapted to accurately measure the volume of liquid passing to the outlet connection; which shall be adapted to dispense a predetermined quantity of liquid for each complete cycle of its operating mechanism; and which shall be adapted to accurately measure the frequency of the operating cycle for the purpose of indicating the volume of fluid dispensed thereby.

Another object of the invention is to provide fluid dispensing devices of the above designated character, which shall be positive in action and adapted for adjustment to render them accurate in measuring the dispensed fluid, and which shall be of simple, compact and durable mechanical construction.

Heretofore, it has been proposed to utilize piston pumps for dispensing gasoline or other fluids by dispensing a given volume of such fluid through a combined pump and measuring cylinder.

In accordance with the present invention I utilize a separate tank to which the liquid to be dispensed is directed by a pump or other fluid pressure device from the main storage tank and from which the liquid to be dispensed is conducted into a measuring chamber such as a cylinder in which a piston is operatively disposed for dispensing the fluid at fixed intervals.

The invention will be more clearly defined and understood in connection with the accompanying drawings in which Figure 1 is a front elevational view partly in section of a liquid dispensing device embodying the principles of this invention; and Figure 2 is an enlarged detail view of the clutch mechanism of Figure 1.

In the drawings, 1 constitutes a plurality of uprights fastened on a base 2, these uprights being preferably four in number. Cross beams or supports 3, 4 and 5 are secured to the uprights and member 3 is adapted to support a motor 6, and a pump 7, the motor being mounted underneath the lower support 3 and the pump on a bracket 8 fastened or made integral with the top of the support 3.

The transverse member 4 carries a recording member 9 and a crank 10 which is secured to the shaft that is journalled in brackets 11 underneath the member 4.

The upper support 5 carries a cylindrical member 12 having a shoulder 13 forming a constricted lower chamber 14 which constitutes a cylinder in which a piston member 15 is disposed for reciprocatory movement. A partition member 16 is secured in the container 12 at the shoulder 13 forming an upper chamber 17 having a vented cover 18 on the top thereof. A valve 19 controls a passage 20 of the partition member 13 which passage is enveloped by a filter screen 21 and a spring 22 is disposed around the stem of the valve 19 and functions to normally bias the valve 19 against its seat on the partition plate 16.

To provide against the trapping of fluid below the piston member 15, a vent or drain 23 is employed which is connected with a drain pipe 24 that constitutes an overflow of chamber 17. The cylinder 14 is provided with a piped passage 25 having a valve 26 and a sight gauge 27 provided therein and being further provided with a flexible outlet conduit 28 at its extended end.

The pump 7 is of the rotary type and is operated through a shaft 29 that is journalled in a pillow block bearing 30 carried by the lower supporting member 3, the shaft being provided with a sprocket gear 31 that is operatively connected by a chain 32 through a pinion member 33 of the motor 6.

The shaft 29 is further provided with a sprocket 34 having a chain connection 35 with a wheel 36 journalled on the shaft. The crank shaft is driven through a friction disc 10', which engages the face of wheel 36 under pressure of spring arms 11'. When the dispensing nozzle of conduit 28 is shut off the piston 15 of the measuring cylinder will stop on account of the disc 10 slipping on the face of wheel 36. When the nozzle valve is opened to release the pressure, piston 15 will immediately operate.

The crank 10 consists of a slotted disc having a pin 37 adjustably mounted in the slot thereof, the pin constituting the pivotal connection for a link or connection rod 38 that is pivotally joined at 39 to the piston rod 40. By adjusting the location of the pin 37 radially in the slot of the disc, the length of stroke of piston 40 may be varied whereby the amount of fluid dispensed from cylinder 14 be accurately controlled. The recording mechanism 9 is connected through linkage 41 with a collar 42 of the piston rod whereby the counter 9 records the number of strokes of the piston.

The pump 7 is connected by a pipe line 44 to a reservoir or tank from which the liquid is pumped and is further provided with a pipe line 45 leading to an upper passage 46 of the chamber 17.

The operation of the device is briefly as follows:—When the motor 6 is energized the liquid is pumped upwardly through the pipe 45 into the upper chamber 17 and the crank 10 simultaneously operates piston 15 which on its down stroke unseats the valves 19 and draws the fluid from the chamber 17 into the cylinder 14. By the suction action of the piston 15, the liquid in the upper chamber 17 will be drawn into the lower cylinder, this suction force being augmented by the gravity flow of the liquid. On the upstroke of the piston the valve 19 is seated which is accomplished at the end of the down stroke of piston 15 automatically on account of failure of suction and the biasing action of the spring 22. With the passage 20 closed, liquid in cylinder 14 will be dispensed and caused to flow through the pipe connection 25 to the outlet conduit 28.

The capacity of pump 7 is such as to supply liquid to the upper chamber 17 in excess of that which is dispensed or withdrawn by piston 15 in the lower cylinder 14 so that an adequate supply of liquid is at all times available in the upper chamber. The excess fluid pumped into chamber 17 passes through the overflow pipe 24 and back into the storage tank to which the pump is connected through the pipe 44.

To adjust the dispensing device to accurately measure the fluid passing through the outlet conduit 28, it is only necessary to adjust the length of stroke of the piston through the position of the crank pin 27, which is readily accomplished by means of a nut element 37. The recording device or counter 9 is calibrated in units corresponding to the volume displaced per stroke from the lower cylinder 14 which may be gallons or one-half gallons as desired. Thus, once the adjustment of the crank has been made to discharge the unit volume corresponding to the calibration of the counter, the dial will advance one graduation for each complete stroke or cycle of movement of the piston rod, thereby indicating the number of units of volume that have been dispensed in cylinder 14 caused to flow to the outlet or delivery conduit 28.

It will be evident from the foregoing description of this invention that a dispensing mechanism made in accordance therewith provides a simple and efficient means for positively or accurately measuring the amount of fluid dispensed thereby and eliminates unnecessary connections and joints which might cause leakage.

Although one embodiment of the invention has been herein illustrated and described, it will be obvious to those skilled in the art that various modifications may be made in the details of construction without departing from the principles herein set forth.

I claim:

1. A dispensing device comprising a supply chamber having a measuring cylinder connected therewith, a valve controlling the passage between said supply chamber and cylinder, a piston in said cylinder for dispensing the contents thereof, and a pump mechanism for conducting fluid from a storage tank to the supply chamber in excess of flow from the latter to the measuring cylinder.

2. A fluid dispensing device comprising a supply chamber, a measuring cylinder connected therewith, a valve controlling the passage from the supply chamber to the measuring cylinder, a piston member operatively disposed in said measuring cylinder, means for supplying fluid to said supply chamber and for simultaneously actuating the piston member in the measuring cylinder whereby fluid is first drawn into the measuring cylinder on the down or suction stroke of its piston member and subsequently dispensed through a discharge passage of the measuring cylinder.

3. A device as set forth in claim 2 provided with a counter for indicating the movement of the piston member whereby the volume of the liquid dispensed through the measuring cylinder may be indicated.

4. A dispensing device comprising a supply chamber, a measuring cylinder in vertical alinement with and disposed below said chamber, said cylinder and chamber having a valved communicating passage therebetween, a pump mechanism connected to supply liquid to said chamber, and a piston in said cylinder operatively connected to said pump mechanism said piston being operative to draw liquid from the chamber to the cylinder to fill the latter in one direction of its travel and to dispense the liquid in equally measured volumes in the opposite direction of travel of the piston member.

In testimony whereof I have hereunto set my hand and seal this 19 day of October, 1929.

JOHN R. FOSTER.